(12) United States Patent
Miller et al.

(10) Patent No.: US 7,583,457 B2
(45) Date of Patent: Sep. 1, 2009

(54) RAM DISK BOOT OF OPTICAL MEDIA IMAGE

(75) Inventors: Wesley Miller, Sammamish, WA (US); Saad Syed, Kirkland, WA (US); Charles T. Lenzmeier, Silverthorne, CO (US)

(73) Assignee: Microsoft Corporation, Redmond, WA (US)

( * ) Notice: Subject to any disclaimer, the term of this patent is extended or adjusted under 35 U.S.C. 154(b) by 1022 days.

(21) Appl. No.: 10/806,517

(22) Filed: Mar. 22, 2004

(65) Prior Publication Data

US 2005/0210228 A1  Sep. 22, 2005

(51) Int. Cl.
 *G11B 20/06* (2006.01)
(52) U.S. Cl. ............................................. 360/30; 713/2
(58) Field of Classification Search ...................... None
See application file for complete search history.

(56) References Cited

U.S. PATENT DOCUMENTS

| | | | |
|---|---|---|---|
| 6,279,109 B1 * | 8/2001 | Brundridge | 713/2 |
| 6,618,857 B1 | 9/2003 | Zimniewicz et al. | |
| 6,944,757 B2 * | 9/2005 | Wilks et al. | 713/2 |
| 7,017,039 B2 * | 3/2006 | Hensley | 713/2 |
| 2002/0013882 A1 * | 1/2002 | Ko et al. | 711/111 |
| 2003/0197963 A1 * | 10/2003 | Wagner et al. | 360/15 |
| 2004/0243385 A1 * | 12/2004 | Rothman et al. | 703/24 |

* cited by examiner

*Primary Examiner*—Jason C Olson
(74) *Attorney, Agent, or Firm*—Lee & Hayes, PLLC

(57) ABSTRACT

A method includes loading an optical media image representing the content of a physical optical media device from an optical media image source into random access memory (RAM) and emulating the physical optical media device using the optical media image. The optical media image is in an optical media format. A system includes an optical media image stored in random access memory (RAM), the optical media image being in an optical media format, and including operating system (OS) code executable by a microprocessor. A RAM disk program accesses the optical media image according to the optical media format.

32 Claims, 5 Drawing Sheets

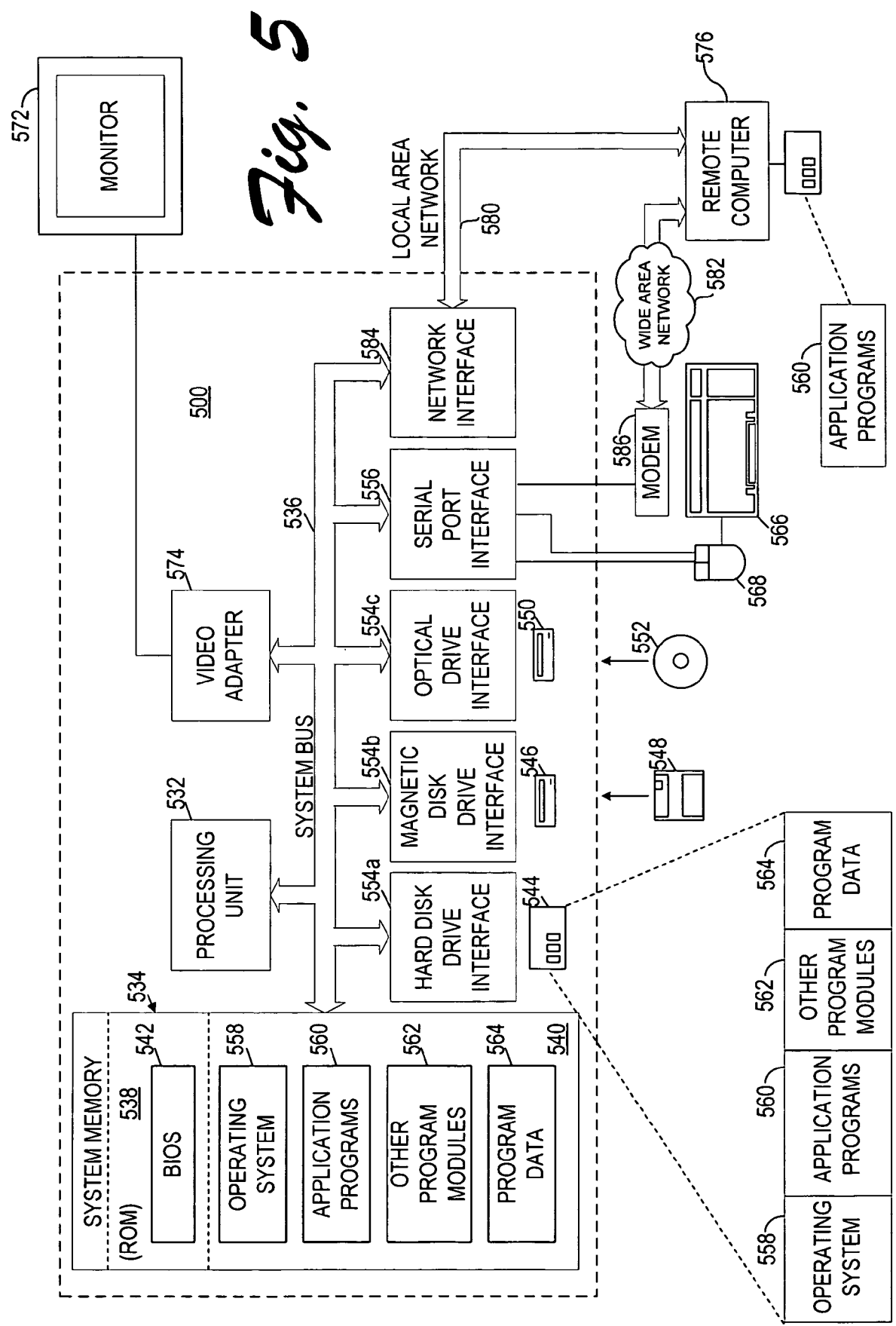

RAM DISK BOOT OF OPTICAL MEDIA IMAGE

TECHNICAL FIELD

The described subject matter relates to electronic computing, and more particularly to systems and methods for random access memory (RAM) disk booting using an optical media image.

BACKGROUND

Booting a computer refers to a process of loading an initial piece of software that starts the computer. Because the computer operating system (OS) is essential for running all other programs, the OS is usually the first piece of software that is loaded. During the boot process, the OS is typically copied from a permanent memory location (e.g., a hard disk) to an impermanent memory location (e.g., random access memory (RAM)). In some specialized computers, such as embedded systems, the OS is copied into a RAM disk.

A RAM disk is a memory-resident program which mimics a hard disk drive using part of the computer's RAM to store data which can be accessed as files. Unfortunately, RAM disks are not typically available in general purpose computers. Implementing a RAM disk has typically required significant effort by the computer user to retrofit the OS. As a result, traditional RAM disks are not readily realized or sufficiently robust to handle optical media formats.

A RAM disk acts as a virtual drive on the computer. A RAM disk allows one to create directories, copy files to and from memory, and so on. The data however is not written onto a hard disk, but remains purely stored into a particular part of RAM. Because physical disks have mechanical parts that allow for seeking to a particular position on the magnetic storage media and to read and write data, physical disks are relatively slow. In some cases, a RAM disk can read and write the same data thirty to sixty times faster than a hard disk. However, the data stored in RAM is "volatile", meaning that the data disappears when power is removed from the RAM.

Unfortunately, traditional RAM disks do not easily allow for representations of software programs embodied on optical media. A primary reason for this is that traditional RAM disks use a cylinder/head/sector format, which is the format traditionally used by disk drives. Thus, for example, a volume accessed by a traditional RAM disk may be a snapshot of an actual system volume on a physical disk and partition in a hard disk drive. Because traditional RAM disks employ a cylinder/head/sector format, and optical media employ a different format (e.g., universal disk format (UDF) or ISO-9660 format), an optical media disk cannot be exactly represented by a traditional RAM disk.

The inability to exactly represent optical media using a traditional RAM disk is a substantial drawback, particularly when considering that the most commonly used form factor for booting the OS outside of the hard disk itself is the compact disc (CD), and may soon be the digital video disk (DVD), both of which are optical media. Transferring an operating system image from optical media to a traditional RAM disk format and accessing the media from the traditional RAM disk may not be simple and may incur unnecessary costs.

In addition, some computers may not have an optical media drive, or the optical media drive may be unavailable for booting the OS. In such circumstances, a program may not be exactly represented in a RAM disk if the program is provided on optical media (e.g., CD or DVD). The requirement for a physical CD in such situations can be a burden. As such, traditional RAM disk approaches do not provide the flexibility and robustness often desired by computer users.

SUMMARY

Implementations are described and claimed herein for booting a computer using a RAM disk based on an optical media format. An optical media image is loaded from a source into RAM and accessed from RAM. The source may be local to the computer or a remote source accessible over a network. Once loaded into RAM, other drives, memory, and resources can be freed for use in activities other than boot-related activities or OS-related activities.

In some implementations, articles of manufacture are provided as computer program products. One implementation of a computer program product provides a computer program storage medium readable by a computer system and encoding a computer program for booting a computer using a RAM disk image of optical media in an optical media format.

The computer program product encodes a computer program for executing on a computer system a computer process that loads an optical media image from a source into RAM. The process further includes emulating an optical image from a physical source by the optical image in RAM. Loading the optical image may involve downloading the optical image from a network boot server.

In another implementation, a method includes identifying an optical media image source having an optical media image from which to boot a computer, and loading at least a portion of the optical media image into a RAM from the optical media image source, without changing the optical media image format. Loading may involve creating a RAM disk wherein the portion of the optical media image is in an optical media format. The method may further include accessing a resource from the optical media image from the RAM disk in response to receiving a call from an application to access the resource on a physical optical device.

In yet another implementation, a system includes a loader loading an optical media image from an optical media image source and onto a RAM disk, the optical media image being formatted in an optical media image format. The system further includes a RAM disk driver accessing the RAM disk according to the optical disk format. The optical media image may include an optical media file system. The RAM disk driver may redirect a request for a resource on an optical media device to a location on the RAM disk containing the resource.

BRIEF DESCRIPTION OF THE DRAWINGS

FIG. 5 is a schematic illustration of an exemplary computing device that can be utilized to implement RAM disk booting of an optical media image.

DETAILED DESCRIPTION

Overview

Briefly, an image loader creates an image of optical media content in RAM where the optical media image is accessible by a RAM disk program. The optical media image is in an optical media format. Because traditional RAM disks are not designed to access RAM data in an optical media format, optical media images typically have not exactly matched the corresponding optical media content. Fortunately, the RAM disk described herein is able to access the optical media image according to the optical media format. As such, accesses to a physical optical media image source by a program are transparently directed to the RAM disk.

Exemplary System

Figure 1:
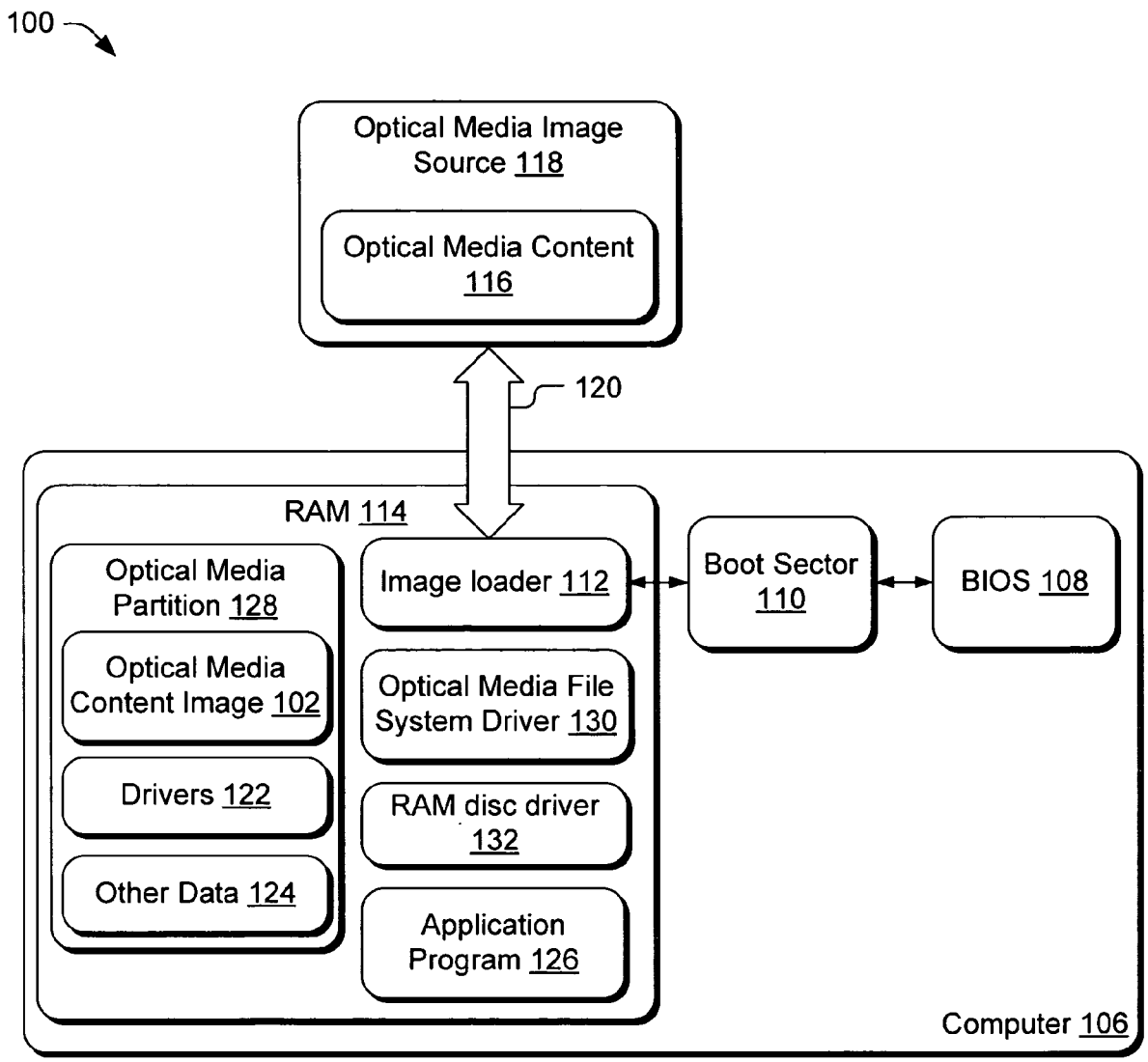
FIG. 1 illustrates an exemplary operating environment for RAM disk booting of an optical media image.

FIG. 1 illustrates an exemplary operating environment 100 booting an optical media image 102 via a random access memory (RAM) disk 104 in a computer 106. When the computer 106 powers up, code in a basic input/output system (BIOS) 108 locates and calls code at a boot sector 110. The boot sector 110 is typically a sector on a physical memory medium, such as a compact disc (CD), DVD, hard disk or floppy disk. The boot sector 110 loads an image loader 112 into RAM 114 to begin the booting process. In certain implementations of the computer 106, the boot sector 110 is not used, but rather the BIOS 108 downloads the image loader 112 from a remote source, such as a pre-boot execution environment (PXE) server.

The image loader 112 is typically implemented in software, but may include hardware and/or firmware as necessary to carry out an image loading and booting process. The image loader 112 copies optical media content 116 from an optical media image source 118 to a location in RAM 114 to create the optical media image 102. The image loader 112 communicates with the optical media source 118 via a communication path 120.

The optical media image source 118 may be local with respect to the computer 106 or remote from the computer 106. Thus, the communication path 120 may be a data bus, for example, in the local case, or a network, in the remote case. Various exemplary data busses and networks are discussed with respect to the computer system shown in FIG. 5.

The optical media image source 118 is any source of content that can be stored in an optical media format, such as, but not limited to, universal disk format (UDF), UDF-bridge, Joliet, or an International Standards Organization (ISO) 9660 optical media format (and derivatives). Exemplary implementations of the optical media image source 118 include, an optical disk drive, or a network boot server, such as a server running the WINDOWS REMOTE INSTALLATION SERVICES (RIS) from MICROSOFT CORPORATION. The optical media image source 118 stores the optical media content 116 and makes the optical media content 116 available for booting the computer 106.

The optical media content 116 is content that is formatted in any optical media format. The optical media content 116 can include any type of computer data and/or code. Data and code in the optical media content 116 may or may not be compressed. In one particular implementation, the optical media content 116 contains operating system (OS) code, such as the Windows Preinstallation Environment (Windows PE) from MICROSOFT CORPORATION. The OS code includes the OS kernel, software interfaces, and other software and data required for the OS to execute.

In general, the optical media image 102 is a section of random access memory (RAM) that has been copied from another memory or storage location. In the implementation shown in FIG. 1, the optical media image 102 is a copy of the optical media content 116. Thus, the optical media image 102 (also referred to as an optical media image) contains the OS that will be loaded on the computer 106. The optical media image 102 is in an optical media format.

The image loader 112 may also load drivers 122 and/or other data 124 required by the optical media image 102 during operation. Drivers 122 can include, by way of example, display drivers, disk drivers, network drivers, printer drivers, speaker drivers, and others. Other data 124 includes any other data, files, and data structures that may be used by the drivers 122, the optical media image 102, and/or other application programs 126 executing on the computer 106.

One implementation of the image loader 112 accesses an information file to determine what needs to be loaded in order to boot the computer 106. The information file lists what drivers and other data need to be loaded into RAM 114, as well as the locations from which the drivers and other data can be obtained. The information file also identifies the optical media content 116 to be loaded, as well as the location from which the optical media content file can be obtained. The image loader 112 copies the optical media content 116 into RAM 114. While copying the optical media content 116, the image loader 112 may decompress the optical media content 116 if it is compressed and requires decompression before it can be loaded.

After the image loader 112 loads the optical media image 102, the drivers 122, and the other data 124, the image loader sets up a logical optical media partition 128 containing the optical media image 102, the drivers 122, and the other data 124. The image loader 112 assigns a unique drive letter to the optical media partition 128 whereby the optical media image 102, the drivers 122, and the other data 124 can be addressed outside of the context of the drive it may have been loaded from. Beneficially, files and data in the optical media partition 128 can be accessed as a virtual drive.

An optical media file system (OMFS) driver 130 and the RAM disk driver 132 are launched to provide mechanisms for accessing the optical media partition 128. The OMFS driver 130 includes software and data for managing files in the optical media partition 126. The OMFS driver 130 recognizes the structure of the optical media partition 128 and reads data from (and may write data to, depending on format and implementation) the optical media partition 128 according to the appropriate optical media format. An exemplary implementation of the OMFS system driver 130 is an ISO, ISO-9660 (or derivative) file system. The OMFS driver 130 interacts with the RAM disk driver 132 to perform accesses to the optical media partition 128.

The RAM disk driver 132 includes software and data for performing any accesses to the optical media partition 128. Such software would serve as an abstraction between any typical file system calls made to an optical drive under typical optical media booting conditions, and would redirect these read or write operations to the virtual disk image existing in the optical media partition 128. Thus, for example, the RAM disk driver 132 requests data at certain memory locations within the optical media partition 128 from the OS. The RAM disk driver 132 and the OMFS driver 130 present a virtual drive to an application 126 that may access the optical media partition 128. The application 126 requests files through the OMFS driver 130. Although a file request may specify a physical drive letter, the requested file is actually obtained from the optical media partition 128. Thus, for example, if the application 126 requests a file from drive 'D:', the OMFS driver 130 and the RAM disk driver 132 will redirect the request to the optical media partition 128 if physical drive 'D:' is represented by the optical media partition 128.

Exemplary Operations for RAM Disk Boot of an Optical Media Image

Described herein are exemplary methods for booting of an optical media image in an optical media format using a RAM disk. The methods described herein may be embodied as logic instructions on one or more computer-readable medium. When executed on a processor, the logic instructions cause a general purpose computing device to be programmed as a special-purpose machine that implements the described methods. In the following exemplary operations, the components and connections depicted in the figures may be used to implement RAM disk booting of an optical media image in a network environment.

Figure 2:
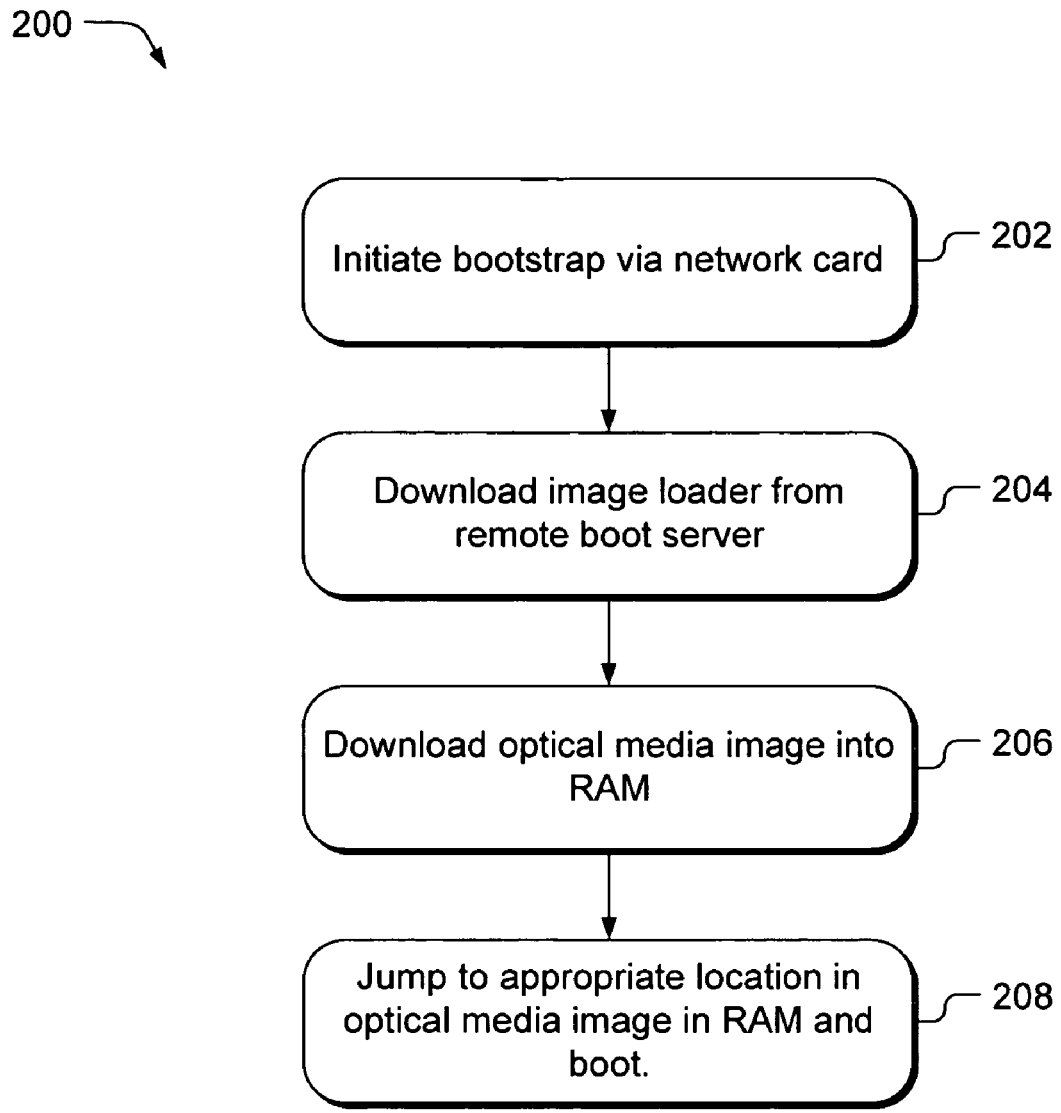
FIGS. 2-4 are flow charts illustrating operation flows or algorithms for use in RAM disk booting of an optical media image.

FIG. 2 illustrates a booting operation flow or algorithm 400 for booting an optical media image using a RAM disk when the source of the optical media image is a remote computer running as a remote boot server. Thus, the algorithm 400 may be executed by a client computer that boots its operating system (OS) from optical media content received over a network from a remote computer.

In the particular implementation shown in FIG. 2, an initiating operation 202 initiates a booting process via a network card. The initiating operation 202 involves identifying the remote computer from which the OS software can be obtained. The initiating operation 202 contacts the remote computer, and may indicate to the remote computer the OS that the client needs. In response, the remote computer transmits image loader software to the client.

A downloading operation 204 downloads the image loader to the client. The image loader includes code for downloading the optical media image, including the OS needed by the client.

Accordingly, in another downloading operation 206, the boot loader downloads the optical media content, including the OS from the remote computer. The boot loader stores the downloaded content in an optical media image in RAM. After the optical media image is stored in RAM, a disk representation is created for virtually representing a physical disk to the OS and higher level application programs.

A jumping operation 208 jumps to a specified location in the optical media image in RAM to finish the boot process. The jumping operation 208 typically jumps to the OS kernel, which controls memory management, disk management, and process and task management.

A particular implementation of an operation for booting from a WINDOWS REMOTE INSTALLATION SERVICE (RIS), from MICROSOFT CORPORATION, is shown next. First, the following directory should be created on the WINDOWS RIS server: \RemoteInstall\Setup<language>\Images\<OS>. The designation <language> could be "English", for example. The <OS> designation specifies the OS being loaded. By way of example, the OS could be WINPE. In this directory, the following set of files is created:

```
\<platform>
   <bootimage>
   \templates
      ntdetect.com
      ntldr (renamed from setupldr.exe)
      winpe.sif
      startrom.com
```

<platform> is, for example, "i386".

<bootimage> is the boot image file. The <bootimage> can be moved farther down in the directory tree.

In this implementation, the winpe.sif file can have any name (e.g., "ristndrd.sif") as long as the extension is sif. The contents of this file is as follows. Note that the [SetupData] section is essentially the same as in the case in which the image is booted from local disk, with a change to the /rdpath switch.

```
[SetupData]
BootDevice = "ramdisk(0)"
BootPath = "\<platform>\system32\"
OsLoadOptions = "/noguiboot /fastdetect /minint
/rdpath=%INSTALLPATH%\%MACHINETYPE%\<bootimage>
[/rdimageoffset=<offset>] [/rdimagelength=<length>] [/rdexportascd]
[RemoteInstall]
Repartition = No
[OSChooser]
Description = "<brief description>"
Help = "<longer description>"
LaunchFile =
"%INSTALLPATH%\%MACHINETYPE%\templates\startrom.com"
ImageType = Flat
Version = "5.2 (0)"
```

In the above example, the "Repartition=No" line can be used to avoid a warning about the disk being erased that may arise if the Client Installation Wizard is used. The Description and Help text are user selectable. LaunchFile and ImageType should not be changed from that shown above. The Version line is optional.

An example implementation for booting from an optical media image obtained from a non-RIS network boot server is illustrated next. Implementation details specific to RAM disk are illustrated here. The initial boot program is startrom.com. Two files, ntldr (renamed from setupldr.exe) and ntdetect.com are stored in the same directory as startrom.com.

Figure 3:
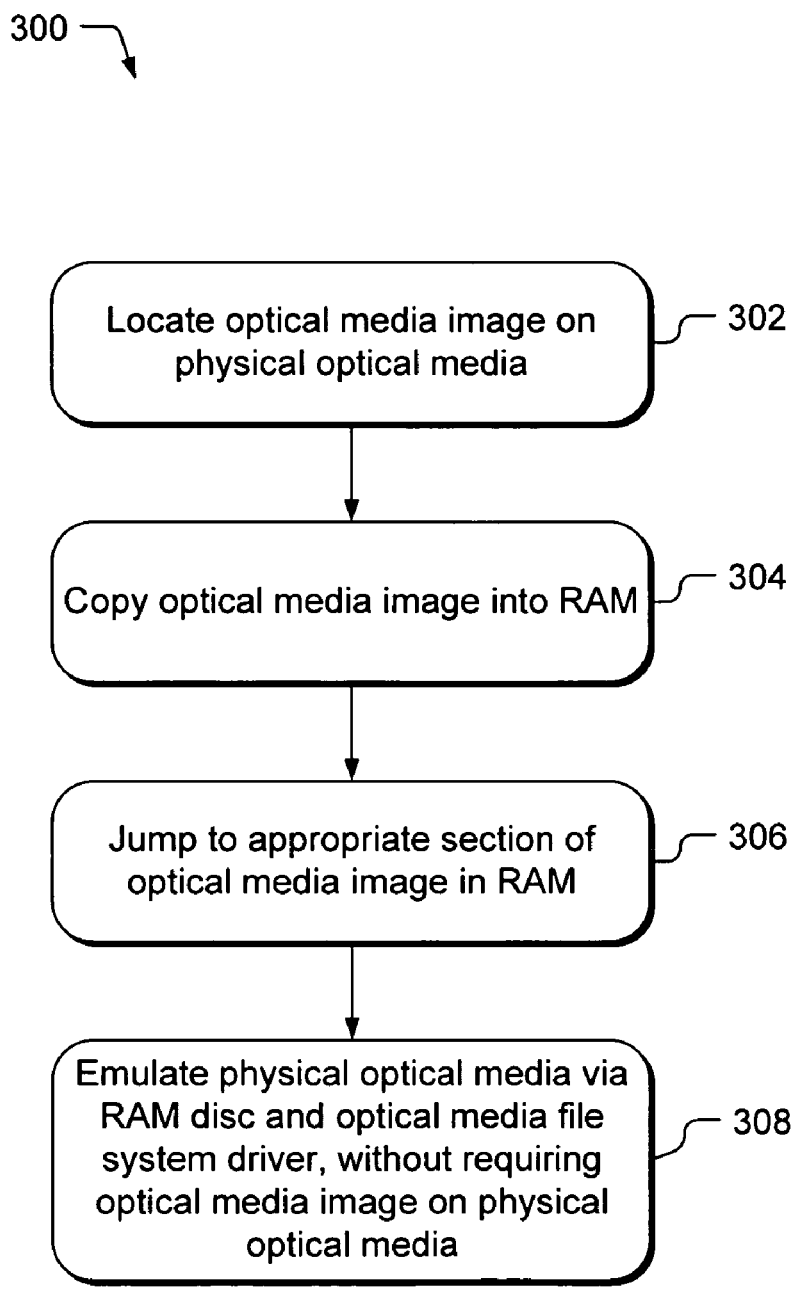

FIG. 3 illustrates another implementation of a booting operation flow or algorithm 300, for booting an optical media image obtained from physical optical media, such as a compact disc (CD) or DVD. The operation flow 300 can be carried out by a single computer. When the computer initially powers-up, the booting process begins from the basic input/output system (BIOS). The BIOS jumps to the boot sector, which loads a boot loader into RAM.

A locating operation 302 locates the optical media content that contains the operating system (OS) software on the physical optical media. One implementation of the locating operation 302 determines the location of the OS from an information file that includes the location of the OS, drivers to be loaded, and other information. A copying operation 304 copies the optical media content including the OS into an optical media image in RAM.

An implementation of the operation flow 300 employs one or more OS load options for locating and booting from the optical media image in RAM. Exemplary options are shown as follows:

/RDPATH—specifies the name of the file that contains the optical media image.

/RDIMAGEOFFSET—specifies the offset within the file of the start of the optical media image. This is used when the file includes a header. If omitted, the image offset is assumed to be 0.

/RDIMAGELENGTH—specifies the length of the optical media image within the file. In other words, the boot image extends from RDIMAGEOFFSET to RDIMA- GEOFFSET+RDIMAGELENGTH−1. If omitted, the image is assumed to extend from RDIMAGEOFFSET to the end of the file.

/RDEXPORTASCD—specifies that once the kernel starts, the RAM disk program should export the RAM disk optical media image as a CD-like device. This means that the RAM disk program reports the device as type FILE_DEVICE_CD_ROM instead of FILE_DEVICE_DISK, and that the RAM disk program reports a CD-compatible drive geometry (e.g., 2048 bytes per sector, etc.). This switch can be specified for ISO/UDF images.

Prior to executing the operation flow 300, the following directory structure should be burned onto the physical optical media:

```
\winnt.sif
\<bootimage>
\<platform>
   bootfix.bin
   ntdetect.com
   setupldr.bin
```

The boot image file can be elsewhere on the physical optical media if necessary. The file 'winnt.sif' has the same contents as in the case of booting from local disk. When the physical optical media is burned, the El Torito boot sector should also be included. The boot image file burned onto the physical optical media can be an ISO, UDF, or UDF-bridge image file.

A jumping operation 306 jumps to a specified location in the optical media image. An emulating operation 308 emulates the physical optical media using a RAM disk program and optical media file system driver that provide access to the optical media image in RAM. The emulating operation 308 redirects physical optical media accesses to the appropriate location in the optical media image in RAM. Because the physical optical media is being emulated in RAM, the physical optical media storing the OS can be removed and replaced with another physical optical media, if desired.

Figure 4:
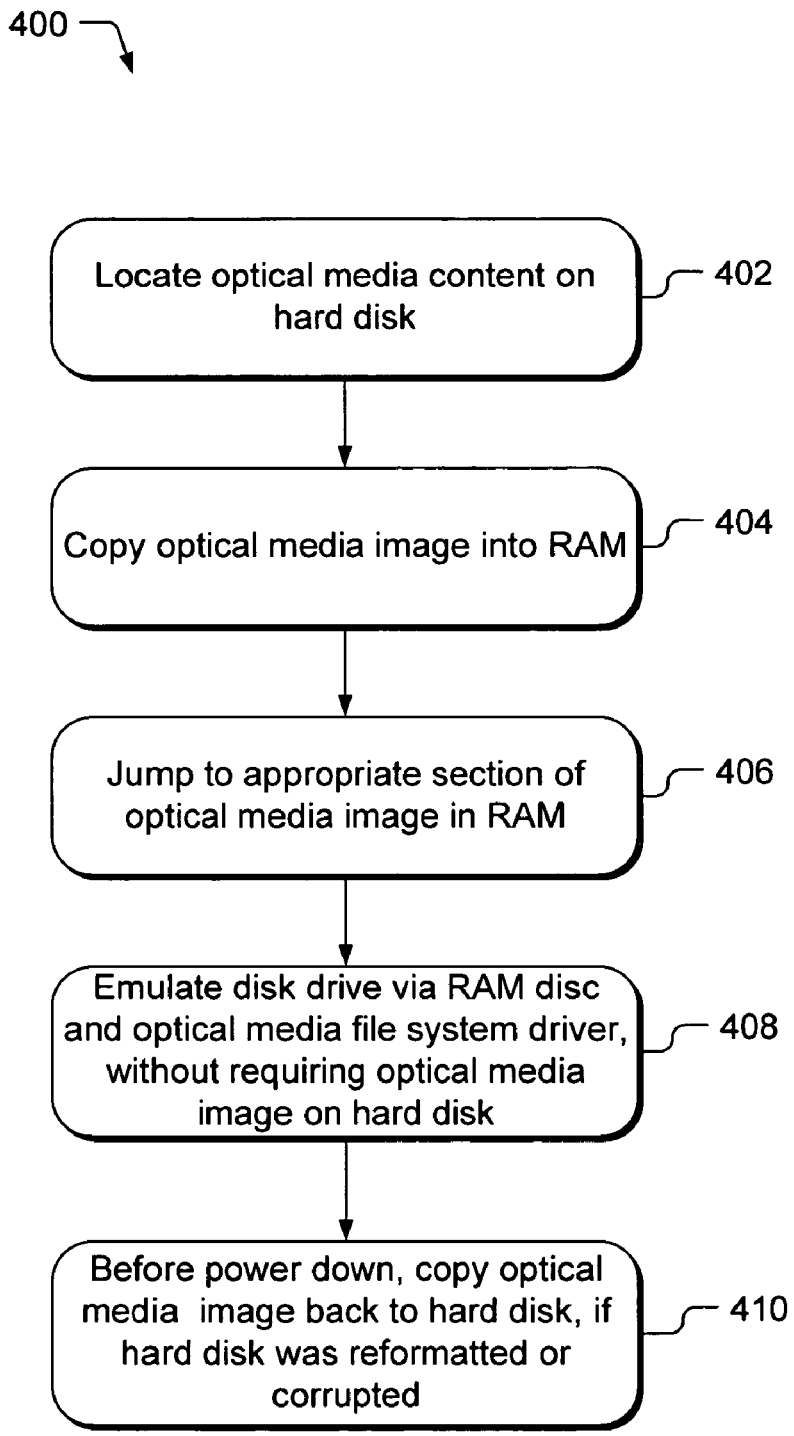

FIG. 4 illustrates yet another implementation of a booting operation flow or algorithm 400, for booting an optical media image obtained from a hard disk. The operation flow 400 can be carried out by a single computer. As discussed above, when the computer initially powers-up, the booting process begins from the basic input/output system (BIOS). The BIOS jumps to the boot sector, which loads a boot loader into RAM.

A locating operation 402 locates the optical media content that contains the operating system (OS) software on a hard disk. One implementation of the locating operation 402 determines the location of the OS from an information file that includes the location of the OS, drivers to be loaded, and other information. A copying operation 404 copies the optical media content including the OS into an optical media image in RAM.

An example of data and steps performed by the locating and copying operation 404 are shown below for booting a WINDOWS PE image copied from a local hard disk. First, copy the boot image (e.g., ISO, UDF or RAM disk) to the local hard disk. Typically the boot image would be stored at the root of the boot partition, but this is not required. Second, create a text file in the root of the boot partition called winnt.sif. This file should to contain the following lines:

```
[SetupData]
BootDevice = "ramdisk(0)"
BootPath = "\<platform>\system32\"
OsLoadOptions = "/noguiboot /fastdetect /minint /rdpath=<bootimage>
[/rdimageoffset=<offset>] [/rdimagelength=<length>] [/rdexportascd]
```

<platform> is, for example, i386

<bootimage> is the path to the boot image file. If the file is on the boot partition, this can be a relative path. For example, if the file is at the root of the boot partition, <bootimage> could be "winpe.iso". If it's in a subdirectory, it could be "tmp\winpe.iso". You can put the file in any ARC-accessible location by specifying a full ARC path, e.g., "multi(0)disk(0)rdisk(0)partition(2)\winpe.iso".

The file winnt.sif has the same contents as in the implementation in which the computer boots from a local disk. The file winnt.sif is stored in the same directory as the image loader. The boot image file can be in a subdirectory below winnt.sif, if desired.

In the particular implementation shown above, the /rdexportascd must be specified for optical media images, but should be omitted for non-optical RAM disk images.

A jumping operation 406 jumps to a specified location in the optical media image. An emulating operation 408 emulates the hard disk using a RAM disk program and an optical media file system driver that provide access to the optical media image in RAM. The emulating operation 408 redirects accesses to the hard disk to the appropriate location in the optical media image in RAM.

Because the physical hard disk is being emulated in RAM, the physical hard disk storing the OS can be reformatted or otherwise used to store other data, if desired. If the hard disk is reformatted or the OS is written over on the hard disk, a copying operation 410 copies the optical media image from RAM onto the hard disk before the computer is powered down.

Exemplary Computing Device

FIG. 5 is a schematic illustration of an exemplary computing device 500 that can be utilized to implement a client, server, or other network node. Computing device 500 includes one or more processors or processing units 532, a system memory 534, and a bus, 536 that couples various system components including the system memory 534 to processors 532. The bus 536 represents one or more of any of several types of bus structures, including a memory bus or memory controller, a peripheral bus, an accelerated graphics port, and a processor or local bus using any of a variety of bus architectures. The system memory 534 includes read only memory (ROM) 538 and random access memory (RAM) 540. A basic input/output system (BIOS) 542, containing the basic routines that help to transfer information between elements within computing device 500, such as during start-up, is stored in ROM 538.

Computing device 500 further includes a hard disk drive 544 for reading from and writing to a hard disk (not shown), and may include a magnetic disk drive 546 for reading from and writing to a removable magnetic disk 548, and an optical disk drive 550 for reading from or writing to a removable optical disk 552 such as a CD ROM, DVD, or other optical media. The hard disk drive 544, magnetic disk drive 546, and optical disk drive 550 are connected to the bus 536 by appropriate interfaces 554a, 554b, and 554c. The drives and their associated computer-readable media provide nonvolatile storage of computer-readable instructions, data structures, program modules and other data for computing device 500. Although the exemplary environment described herein employs a hard disk, a removable magnetic disk 548 and a removable optical disk 552, other types of computer-readable media such as magnetic cassettes, flash memory cards, digital video disks, random access memories (RAMs), read only memories (ROMs), and the like, may also be used in the exemplary operating environment.

A number of program modules may be stored on the hard disk 544, magnetic disk 548, optical disk 552, ROM 538, or RAM 540, including an operating system 558, one or more application programs 560, other program modules 562, and program data 564. A user may enter commands and information into computing device 500 through input devices such as a keyboard 566 and a pointing device 568. Other input devices (not shown) may include a microphone, joystick, game pad, satellite dish, scanner, or the like. These and other input devices are connected to the processing unit 532 through an interface 556 that is coupled to the bus 536. A monitor 572 or other type of display device is also connected to the bus 536 via an interface, such as a video adapter 574.

Generally, the data processors of computing device 500 are programmed by means of instructions stored at different times in the various computer-readable storage media of the computer. Programs and operating systems may be distributed, for example, on floppy disks, CD-ROMs, or electronically, and are installed or loaded into the secondary memory of the computing device 500. At execution, the programs are loaded at least partially into the computing device's 500 primary electronic memory.

Computing device 500 may operate in a networked environment using logical connections to one or more remote computers, such as a remote computer 576. The remote computer 576 may be a personal computer, a server, a router, a network PC, a peer device or other common network node, and typically includes many or all of the elements described above relative to computing device 500. The logical connections depicted in FIG. 5 include a LAN 580 and a WAN 582. The logical connections may be wired, wireless, or any combination thereof.

The WAN 582 can include a number of networks and subnetworks through which data can be routed from the computing device 500 and the remote computer 576, and vice versa. The WAN 582 can include any number of nodes (e.g., DNS servers, routers, etc.) by which messages are directed to the proper destination node.

When used in a LAN networking environment, computing device 500 is connected to the local network 580 through a network interface or adapter 584. When used in a WAN networking environment, computing device 500 typically includes a modem 586 or other means for establishing communications over the wide area network 582, such as the Internet. The modem 586, which may be internal or external, is connected to the bus 536 via a serial port interface 556.

In a networked environment, program modules depicted relative to the computing device 500, or portions thereof, may be stored in the remote memory storage device. It will be appreciated that the network connections shown are exemplary and other means of establishing a communications link between the computers may be used.

The computing device 500 may be implemented as a server computer that is dedicated to server applications or that also runs other applications. Alternatively, the computing device 500 may be embodied in, by way of illustration, a stand-alone personal desktop or laptop computer (PCs), workstation, personal digital assistant (PDA), or electronic appliance, to name only a few.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer-readable media. Computer-readable media can be any available media that can be accessed by a computer. By way of example, and not limitation, computer-readable media may comprise "computer storage media" and "communications media."

"Computer storage media" includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer-readable instructions, data structures, or program modules. Communication media also includes any information delivery media. By way of example, and not limitation, communication media includes wired media such as a wired network or direct-wired connection, and wireless media such as acoustic, RF, infrared, and other wireless media.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

What is claimed is:

1. A method comprising:
   loading an image loader into random access memory (RAM);
   creating, via the image loader, an optical media image in the RAM by copying an optical media content from an optical media source to a location in the RAM, the optical media image being in an optical media format; and
   accessing the optical media image in the optical media format via a RAM disk program to emulate the optical media content of the optical media source.

2. The method as recited in claim 1, wherein the optical media content contains an operating system code.

3. The method as recited in claim 1 wherein copying an optical media content from an optical media source comprises copying the optical media content from a remote computer.

4. The method as recited in claim 1, wherein creating an optical media image comprises decompressing the optical media image.

5. The method as recited in claim 1, further comprising initializing the optical media image in RAM.

6. The method as recited in claim 1, wherein:
loading an image loader comprises downloading the image loader from a first network boot server; and
copying an optical media content from an optical media source comprises downloading the optical media image from either the first network boot server or a second network boot server.

7. The method as recited in claim 1, wherein copying an optical media content comprises copying the optical media image from a compact disc.

8. The method as recited in claim 1, wherein the optical media content is formatted in a universal disk format (UDF).

9. The method as recited in claim 1, wherein the optical media content is in a format based on an International Standards Organization (ISO) optical media format.

10. The method as recited in claim 1, further comprising launching an optical media file system driver operable to access a file structure in the optical media image.

11. The method as recited in claim 1, wherein accessing the optical media image includes using the RAM disk program to redirect requests for a resource on the optical media source from the optical media source to a corresponding location on the optical media image.

12. The method as recited in claim 1, further comprising creating, via the optical media image, an optical media partition, the optical media partition containing the optical media image.

13. The method comprising:
downloading an image loader into random access memory (RAM);
requesting, via the image loader, an optical media content stored in an optical media format, the optical media content containing an operating system code for booting a computer; and
in response to receiving the request, copying the optical media content to the RAM to create an optical media image, the optical media image being in an optical media format.

14. The method as recited in claim 13, further comprising identifying an operating system used by the computer based on information in the request.

15. The method as recited in claim 13, wherein copying the optical media content to the RAM comprises copying the optical media content from a compact disk.

16. A method as recited in claim 13 further comprising storing the optical media content in a universal disk format.

17. A method as recited in claim 13 further comprising compressing the optical media content.

18. One or more computer readable media comprising computer-executable instructions that, when executed by a computer, perform acts comprising:
loading an image loader into a random access memory (RAM);
loading an optical media image, via the image loader, from an optical media source to the RAM, the optical media image being in an optical media format; and
emulating the optical media source using the optical media image.

19. One or more computer readable media as recited in claim 18, wherein the emulating operation comprises accessing the optical media image with a RAM disk program.

20. One or more computer readable media as recited in claim 18, wherein loading an optical media image comprises:
accessing an information file via the image loader, the information file identifying the location of the optical media content; and
loading the optical media image from the identified location to the RAM.

21. One or more computer readable media as recited in claim 18, wherein loading an optical media image comprises copying the optical media content from a remote computer.

22. One or more computer readable media as recited in claim 18, wherein loading an optical media image comprises copying the optical media content from a compact disk.

23. One or more computer readable media as recited in claim 18, further comprising decompressing the optical media content.

24. A system comprising:
an optical media source including an optical media content the optical media content being in an optical media format;
an image loader stored in a random access memory (RAM), the image loader operable to create an optical media image in the RAM by copying the optical media content from the optical media source to the RAM; and
a RAM disk program operable to access the optical media image.

25. A system as recited in claim 24, wherein the optical media format is a universal disk format.

26. A system as recited in claim 24, wherein the optical media image includes an optical media file system.

27. A system as recited in claim 24, further comprising an optical media file system driver operable to manage files stored in the optical media image.

28. A system as recited in claim 24, further comprising an information file stored in the RAM, the information file identifying the location of the optical media content.

29. A system as recited in claim 24, wherein the optical media image is operable to create an optical media partition.

30. A system for booting a computer comprising:
an optical media source including an optical media content, the optical media content being in an optical media format and including an operating system (OS) code;
an image loader stored in a random access memory (RAM), the image loader operable to create an optical media image that includes the operating system code in the RAM by copying the optical media content from the optical media source to the RAM; and
a RAM disk program stored in the RAM, the RAM disk program operable to cause the computer to boot by accessing the optical media image.

31. A system as recited in claim 30, further comprising an information file stored in the RAM, the information file identifying the location of the optical media content.

32. A system as recited in claim 30, further comprising an optical media file system driver operable to determine a memory location in the optical media image corresponding to a memory location in the optical media content on the optical media content source.

* * * * *